United States Patent Office 2,819,910
Patented Jan. 14, 1958

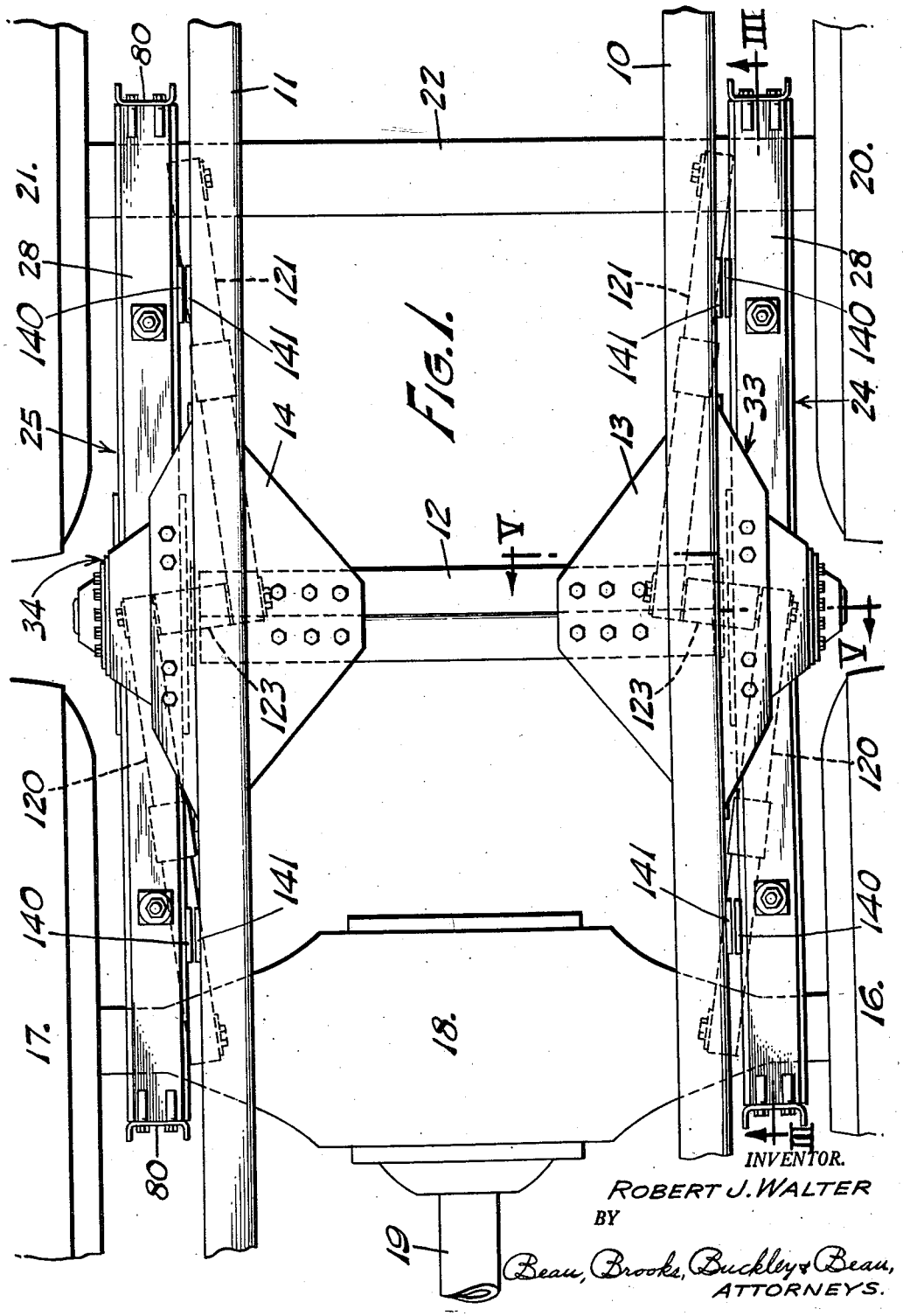

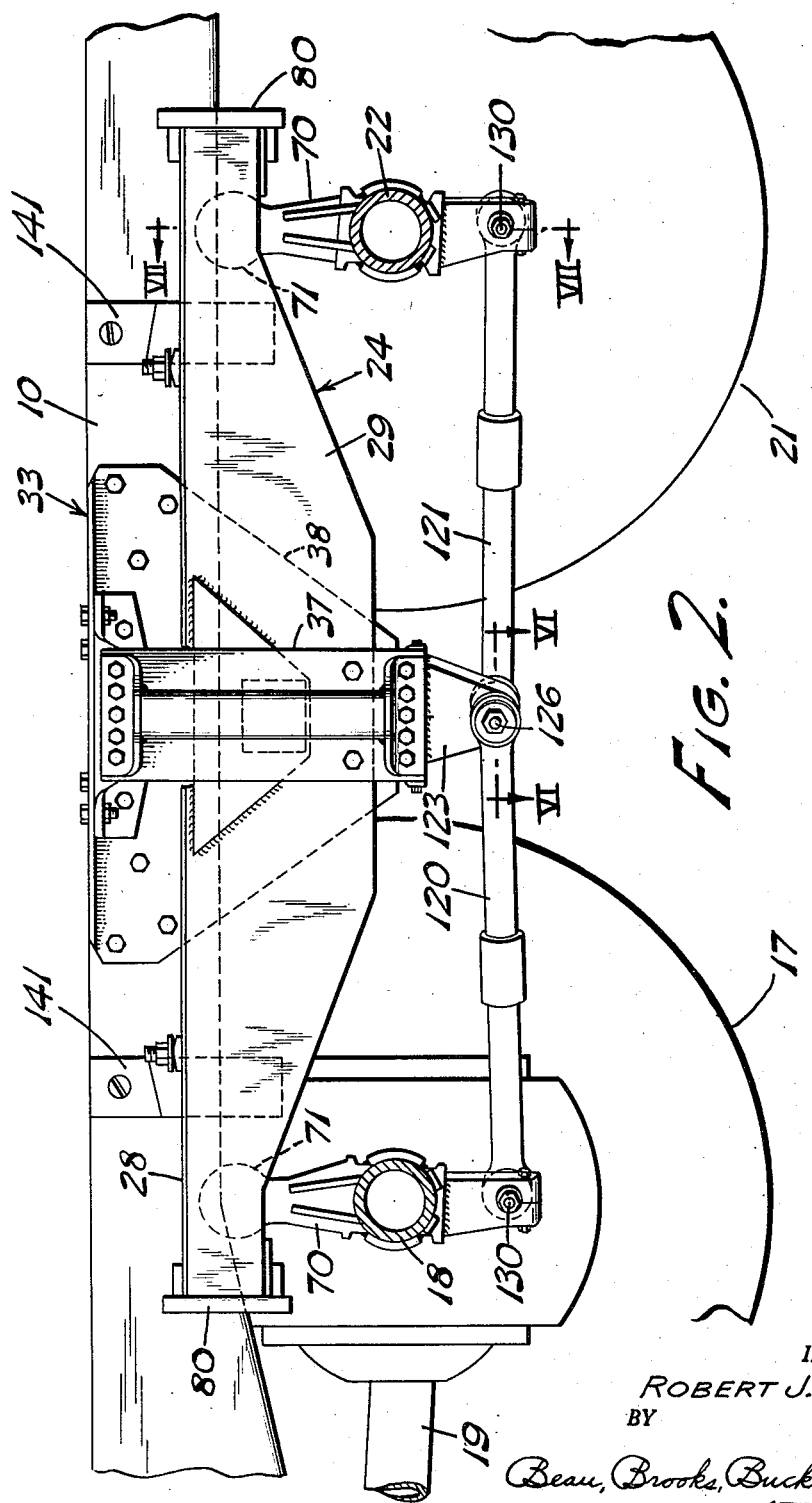

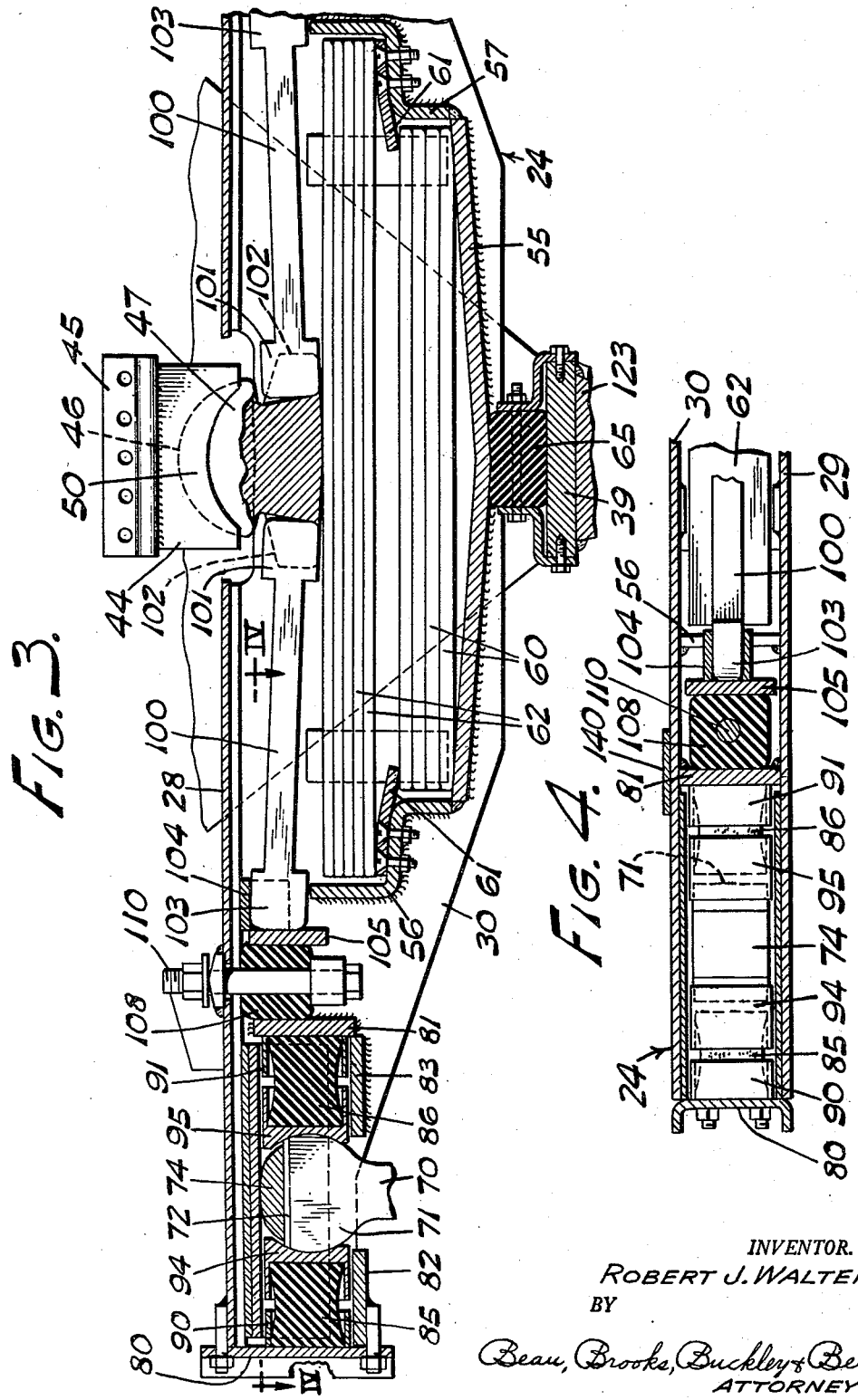

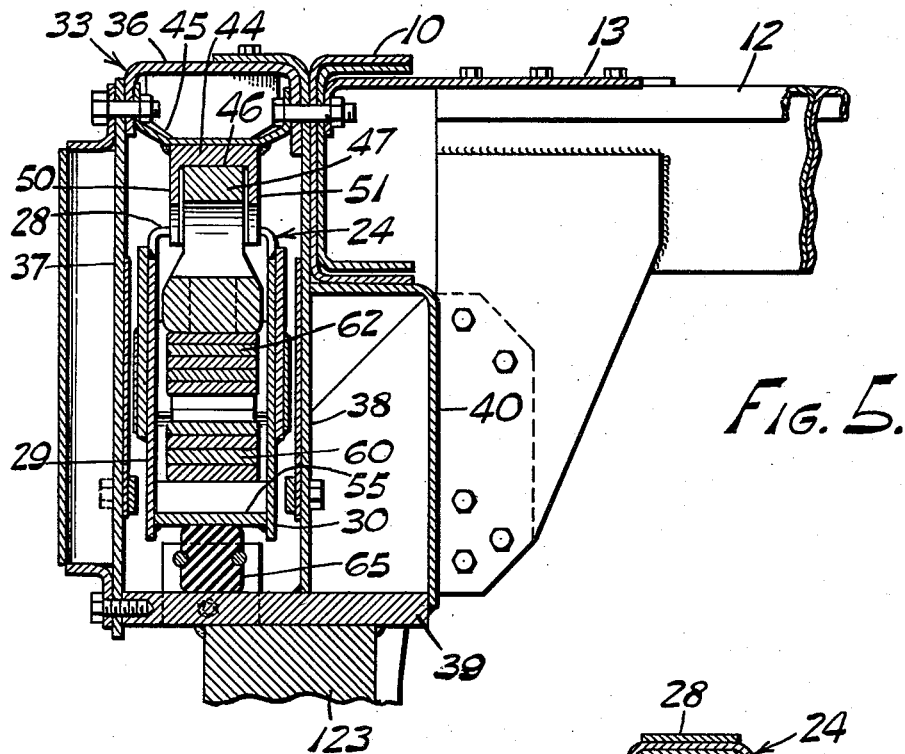
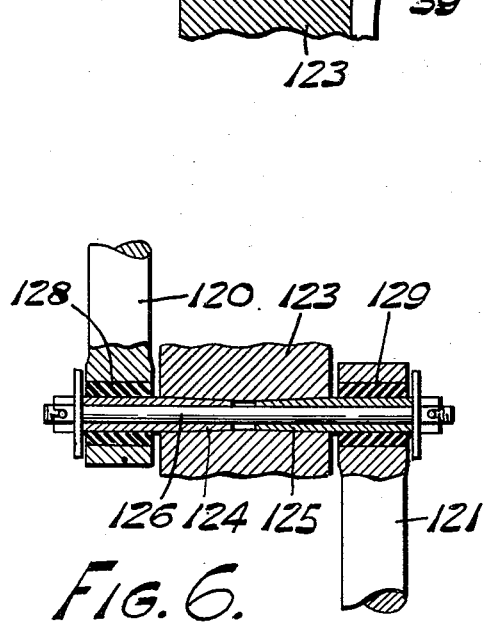
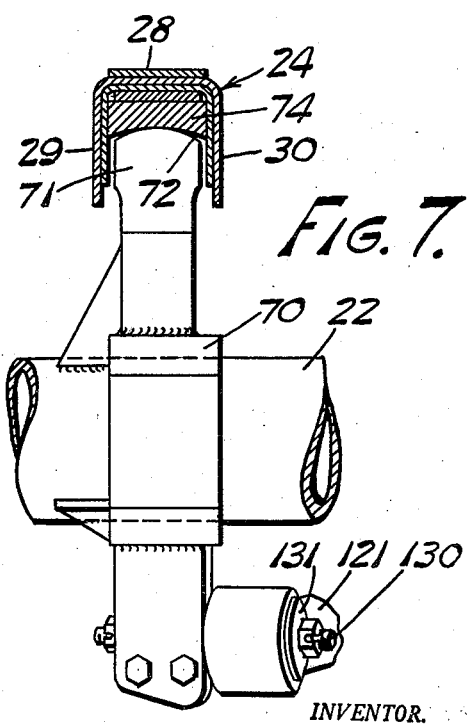

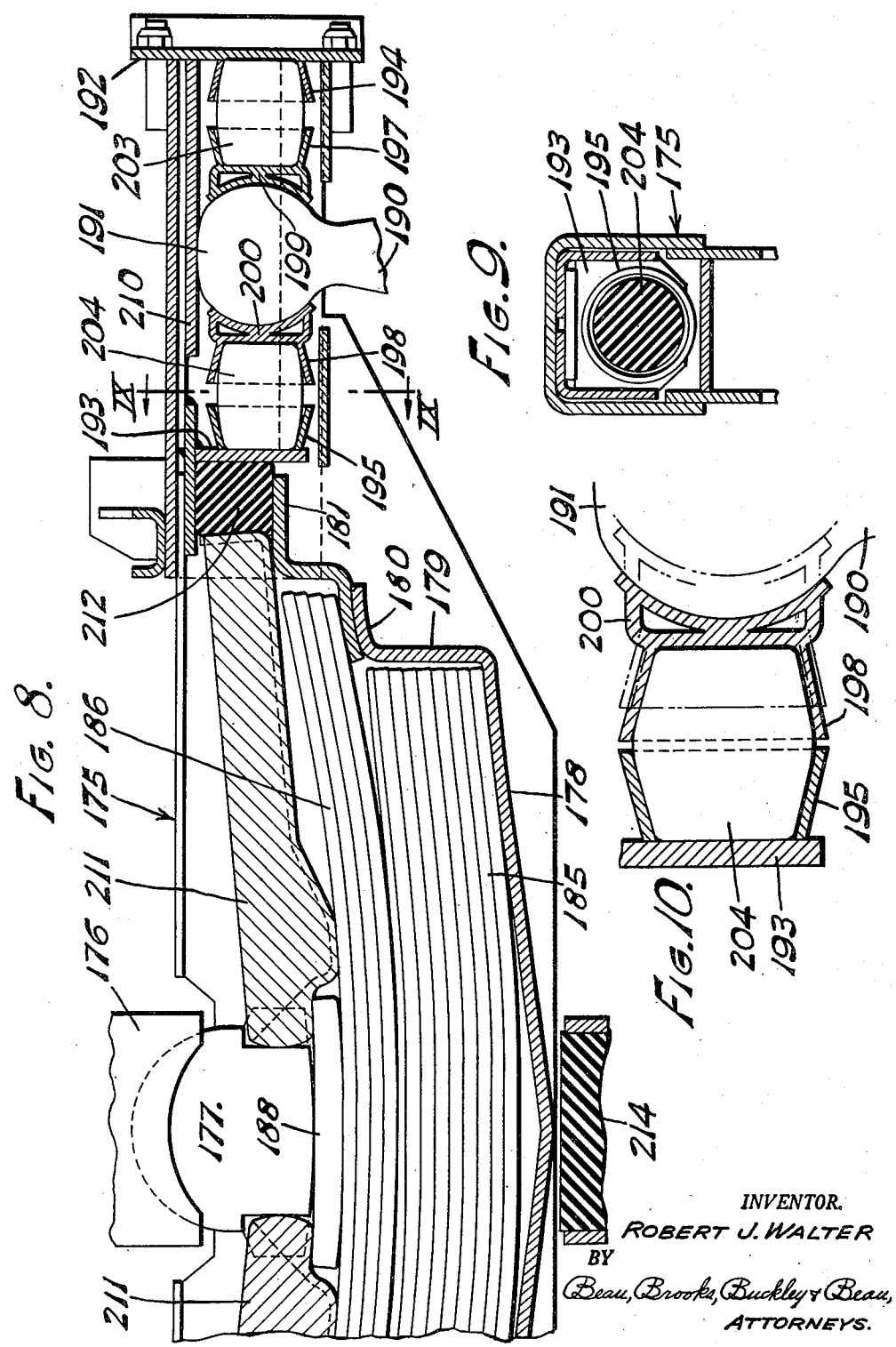

2,819,910

TANDEM VEHICLE WHEEL SUSPENSION

Robert J. Walter, Kenmore, N. Y., assignor to Truck Equipment Co., Inc., Buffalo, N. Y.

Application February 28, 1955, Serial No. 490,917

39 Claims. (Cl. 280—104.5)

This invention relates to tandem axle suspensions for vehicles. The principles of the present invention may be applied in various environments including both road vehicles and rail vehicles.

A familiar field of use is in rear suspensions of motor trucks, trailers and semi-trailers and in such applications the invention may be adapted to tandem axle suspensions wherein one of the tandem axles is a driving axle, wherein both of the tandem axles are driving axles, or wherein both of the tandem axles are dead or trailing axles.

Speaking generally, the present suspension comprises, at each side of the vehicle, a rigid longitudinal housing member which operates in the manner of a walking beam, having means at its opposite ends for engagement with the opposite ends of the longitudinally spaced tandem axles at one side of the vehicle. The central portion of the rigid walking beam is provided with means for association with the load bearing frame of the vehicle, such vehicle load-bearing frame being adapted, in a preferred form, to rest on the central upper portion of a leaf spring assembly which is housed within and supported by the rigid walking beam member.

While vertical loads applied by the vehicle body and frame assembly are applied in the first instance to the leaf spring members, for ultimate transmission to the rigid walking beam member, the horizontal relationship of the load-bearing or load-applying components and the supporting means for the tandem axles which are located at the opposite ends of the rigid walking beam member, as to longitudinal spacing and the application of longitudinal thrust forces, are determined and controlled by the rigid walking beam member and means associated therewith and cooperating independently of the leaf spring members.

The arrangement of the present invention provides a rigid longitudinally extending box or casing member at each side of the tandem suspension which acts in the manner of a walking beam and embodies self-contained spring means and, likewise self-contained but more or less independently operating, distance means for maintaining the longitudinal spacing of the axles with respect to themselves and with respect to the vehicle body under various operating conditions.

The preferred construction provides a support member midway of each of the longitudinal members referred to above which transmits downward forces of the vehicle body to the spring means incorporated in the longitudinal member and at the same time transmits relative horizontal forces to the axle-engaging end structures of the longitudinal walking beam members and thus maintains the established spacing of the axles and the vehicle load within predetermined limits.

The self-contained distance rod arrangement embodied in the longitudinal walking beam members is such as to avoid bearing connections such as universal joints or the like, the distance rod members being simple abutment or compression members acting between a medial load support member and tandem axle connection members lying at each side of the support at the opposite ends of the longitudinal members.

Since the distance rod members lie in the same vertical longitudinal plane as the spring members or means and are closely associated with the same, all harmful or troublesome transverse force couples as between these components are virtually eliminated.

The construction of the present invention further includes control link means to provide self-steering of the wheels supported by the tandem axles and these control links, in the preferred form of the present invention, directly underlie the longitudinal box or casing members which form the walking beam supports alluded to above. Thus, the control links lie substantially in the same vertical planes as the spring supports and the distance means described above and this arrangement still further serves to virtually eliminate oblique or transverse force couples which are unavoidable when some or all of these means are spaced from each other transversely of the vehicle.

The arrangement of the present invention is further such as to provide a simple and clean design wherein the entire tandem axle suspension, including the spring supporting means, the self-steering control link means, and the longitudinal distance means, is all encompassed within a relatively small space which in the present instance is confined entirely to the space normally occupied by conventional leaf spring means between the longitudinal truck body framing support members and the wheels themselves. Thus none of the components of the suspension as recited above lie inward of the longitudinal framing members as is clearly shown in the drawings herein.

The arrangement of the present invention is simple and economical to manufacture. Close fits and tolerances are to a great extent eliminated or minimized and assembly and disassembly is extremely simple. Thus the maintenance of the present tandem axle suspension is also rendered more economical and convenient than in comparable prior art suspensions.

A single specific embodiment of the principles of the present invention is shown in the accompanying drawings and described in detail in the following specification. However, it is to be understood that such embodiment is set forth by way of example only and that various mechanical modifications may be made within the scope of the present invention, such scope being limited only as defined in the appended claims.

In the drawings:

Fig. 1 is a fragmentary top plan view of a vehicle equipped with one form of the tandem rear axle of the present invention;

Fig. 2 is a side elevational view of the structure of Fig. 1, partly in cross section;

Fig. 3 is a cross-sectional view taken generally on the line III—III of Fig. 1;

Fig. 4 is a fragmentary cross-sectional view taken approximately on the line IV—IV of Fig. 3;

Fig. 5 is a transverse fragmentary cross-sectional view on the line V—V of Fig. 1;

Fig. 6 is a fragmentary cross-sectional view on the line VI—VI of Fig. 2;

Fig. 7 is a fragmentary elevational view, partly in cross section, viewed as indicated by the line VII—VII of Fig. 2;

Fig. 8 is a view similar to Fig. 3 but showing a modified form of the construction of the present invention;

Fig. 9 is a transverse cross-sectional view on the line IX—IX of Fig. 8; and

Fig. 10 is a fragmentary view taken similarly to Fig. 8 but showing only one of the rock arm cushioning elements of the structure and its related parts.

Like characters of reference denote like parts throughout the several figures of the drawings and the numerals 10 and 11 designate a pair of longitudinal channel members of a truck framing chassis. Figs. 1 and 5 show a transverse bracing structure 12 which is rigidly attached across the channel members 10 and 11 and secured thereto by conventional gusset plates 13 and 14.

In the construction shown herein by way of example the numerals 16 and 17 designate a pair of forward rear wheels connected by a driving axle housing 18 having a conventional drive shaft 19. The numerals 20 and 21 designate a pair of rearward rear wheels which in the present instance are connected by a dead axle housing 22, although the construction of the present invention is particularly adaptable to tandem rear wheel suspensions wherein both of the tandem axles are driving axles and is also applicable to tandem axle suspensions wherein both axles are dead axles.

The principal supporting components of the tandem axle suspension of the present invention are a pair of opposite longitudinally extending box-like members designated generally 24 and 25. Speaking generally, the longitudinal members 24 and 25 comprise walking beam members which receive the upward thrusts of the wheel mounts adjacent to their front and rear ends and receive the opposing downward thrust of the vehicle chassis and body from the longitudinal channel members 10 and 11 at substantially the mid points along the longitudinal walking beam member 24 and 25. In the present instance the longitudinal members 24 and 25 are assembled from various flanged sheet metal or plate components which are secured by welding, riveting, screwing or bolting or any combination of conventional securing means, but essentially each comprises a longitudinal top wall 28, an outer depending longitudinal wall 29, and an inner depending longitudinal wall 30.

The manner in which the weight of the vehicle frame and body is applied to the mid points of the longitudinal members 24 and 25 will now be described. The longitudinal chassis channel members 10 and 11 have fixed to their outer and lower faces seat members designated generally 33 and 34, respectively. The seat members 33 and 34 are assembled from various flanged sheet metal or plate members but each comprises essentially, as shown particularly in Fig. 5, an upper wall portion 36, outer and inner wall portions 37 and 38, respectively, a bottom wall member 39, and an inner angular seat portion 40 which underlies the longitudinal chassis channel member 10, in the case of Fig. 5. These seat members extend generally about the mid portions of the longitudinal members 24 and 25 in loosely embracing relation therewith.

The entire suspension means disclosed herein is duplicated at opposite sides of the vehicle as indicated in Fig. 1. Detailed reference will be made herein to the left-hand suspension but it is to be understood that the structure thus described is duplicated at the right-hand side of the vehicle.

Referring particularly to Fig. 5, and to some extent to Fig. 3, seat member 33 has fixed to its interior upper central portion a saddle member 44, as by means of a bracket 45. Saddle member 44 has at its under side a concave arcuate bearing surface which rests upon a complementary convex arcuate bearing surface 46 which is formed at the upper surface of a support block 47. In the present instance the saddle member 44 has outer and inner depending shrouding wall portions 50 and 51 which extend downwardly at opposite sides of the upper portion of support block 47. The lower surface of support block 47 is slightly convex as illustrated in Fig. 3 and seats medially against the upper surface of a leaf spring arrangement which will now be described.

The supports for the leaf spring assemblies comprise transverse lower wall means fixed between the mid portions of the depending walls 29 and 30 of the longitudinal members 24 and 25. In the illustrated instance such wall means comprises a bottom wall member 55 and stepped end wall members 56 and 57, all as clearly shown in Fig. 3. The central portion of bottom wall 55 slopes downwardly toward its mid portion as shown in Fig. 3 and a plurality of spring leaves 60 rest on wall 55 in superposed relation. Because of the downwardly sloping arrangement of bottom wall 55 the stack of spring leaves 60 rests thereon or is supported thereby at the end portions of the lowest leaf thereof. Clips 61 associated with the end members 56 and 57 retain the spring leaves 60 against inadvertent upward displacement.

An upper series or stack of spring leaves 62 rests at its ends upon the offset end members 56 and 57 or, more accurately in the present instance, rests upon the clips 61. The bottom convex face of support block 47 rests upon the upper leaf of the spring leaf stack 62 at its mid point and it will be noted that, in the unstressed or only slightly stressed condition of Fig. 3, the weight imposed upon the spring leaves by block 47 is borne entirely by the upper spring leaf stack 62 which is, in the condition shown in Fig. 3, spaced entirely upwardly of the lower series of spring leaves 60.

As the stress on the spring leaves 62 increases and they deflect downwardly to a predetermined degree the mid portion of the lowest of the spring leaves 62 comes into engagement with the mid point of the upper surface of the top one of the spring leaves 60, whereupon a portion of the downward force of support block 47 is borne by the spring leaves 60, such portion being proportionately increased as downward deflection of the upper spring leaf series 62 increases.

While the present example shows two series of progressively engaged spring leaves it is to be understood that three such groups or series may be employed or even more, as circumstances or design requirements may dictate.

The lower wall portion 39 of each of the seat members 33 and 34 is provided with a rubber bumper 65 which is secured to its upper surface in the manner illustrated in Fig. 3 and bears against the lower surface of bottom wall 55. Rubber bumper 65 serves as a rebound preventing member which resiliently limits undue relative upward movement of the seat members 33 and 34 with respect to the longitudinal members 24 and 25.

Reference will now be had to the manner in which the upward thrust of the wheel members and the axles supporting them is transmitted to the opposite ends of the longitudinal members 24 and 25. In this connection reference will be had particularly to Figs. 2, 3, 4 and 7.

Each of the axle housings 18 and 22 has fixed to its opposite ends, inwardly of the ground wheels supported thereby and in alignment with the longitudinal members 24 and 25, a generally vertical rock arm 70. Each rock arm 70 terminates upwardly in a generally cylindrical enlargement 71 which is supported in an end of one of the longitudinal members 24 and 25 in a manner which will now be described. Each enlargement 71, in addition to being generally cylindrical as viewed in side elevation, is provided with a longitudinally extending upper surface which is arcuate as viewed lengthwise of the vehicle, this arcuate upper surface being best shown in Fig. 7 and designated 72.

Each of the enlargements 71 at the upper end of each rock arm 70 has seated upon its upper arcuate surface 72 a bearing block 74. The under side of each bearing block 74 is arcuate as viewed endwise in Fig. 7 to rest upon the arcuate upper surface 72 of the underlying enlargement 71 and the upper surface of each block 74 is generally arcuate or curved as viewed in side elevation, that is, as viewed in Fig. 3.

Each end of each longitudinal member 24 and 25 has detachably but rigidly secured thereto an end wall member 80 as clearly shown in Fig. 3, and a further vertical transverse wall portion 81 inwardly of end wall 80 which may be permanently attached between the side portions 29 and 30 as my welding. A pair of bottom wall members 82 and 83 are likewise fixed between side wall portions 29 and 30 of the longitudinal members 24 and 25 at each end thereof between each end wall 80 and its adjacent vertical wall 81.

It will be noted that each end wall 80, inner wall 81 and bottom wall members 82 and 83 cooperate with top wall 28 and side walls 29 and 30 at each end of the longitudinal members to provide facing square or rectangular pockets or recesses at each side of the cylindrical enlargement 71 of each rock arm 70. The pockets thus formed receive opposed rubber insert members 85 and 86 which in the present instance are somewhat of hour glass form to permit free lateral expansion within the pockets. The rubber insert members 85 and 86 are circular as viewed from their ends, that is as viewed from the front or rear of the vehicle.

The wall members 80 and 81 are provided with circular locating or retaining members 90 and 91 which receive the adjacent ends of the rubber insert members 85 and 86 as shown in Fig. 3. The ends of the rubber inserts 85 and 86 which lie adjacent to cylindrical enlargement 71 of rock arm 70 seat within circular cup formations formed on rectangular bearing members 94 and 95 and the facing surfaces of bearing members 94 and 95 are arcuate as viewed in side elevation to complement the cylindrical formation 71 whereby the latter bears against the members 94 and 95 at opposite sides, all as clearly illustrated in Fig. 3.

Longitudinally extending distance or spacing rods 100 are provided which act between each central support member 47 and the fixed transverse wall portions 81 at each end of each of the longitudinal members 24 and 25. The inner ends of the distance members 100 have vertically enlarged head portions 101 which are retained between pairs of vertical side flanges 102 which extend forwardly and rearwardly from the base portions of each of the support blocks 47. At their opposite ends each of the distance members 100 are likewise vertically enlarged as at 103 and engage in longitudinally movable seat members 104 which extend over the tops and sides of the enlarged head portions 103 and have end wall portions 105.

Rubber insert blocks 108 lie between the end member 105 of each seat 104 and the corresponding fixed transverse wall portion 81. The rubber insert blocks 108 are retained against disassembly by bolts 110 which are supported from the top wall 28 of the longitudinal members 24 and 25. Pulling up on the bolts 110 compresses the insert blocks 108 vertically and tends to increase their longitudinal dimension, thus resiliently adjusting the pressure which they exert between the end members 105 of seats 104 and the wall portions 81. It will be noted that the outer enlarged ends 103 of the distance members 100 are retained loosely against downwardly disassembly by the upper ends of the offset wall members 56 and 57.

Reference will now be had to the means provided to assure self-steering of a vehicle in rounding curves or other turning or swerving operations of the vehicle. Such means comprise radius rods or control links which are best shown in Figs. 1 and 2 and comprise a forward pair of control links 120 and a rearward pair designated 121. As viewed in plan each pair of links 120 and 121 converges toward a forward point along the longitudinal center line of the vehicle.

The control links 120 and 121 at each side of the vehicle are parallel to each other as viewed in plan and are both mounted at their forward and rearward ends for pivotal movement on axes extending at right angles to the longitudinal center lines of the control links. A central control link bearing bracket 123 is fixed to the underside of each of the bottom walls 39 of the seat members 33 and 34 whereby bearing brackets 123 are fixed with respect to the vehicle frame.

The bearing axes of the bearing brackets 123 extend generally horizontally and at right angles to the directions of extent of the control links 120 and 121 which are associated therewith. The inner or proximate ends of the control links 120 and 121 are pivotally supported at opposite sides of the bearing brackets 123 as clearly shown in Fig. 6. The pivotal connection means comprises a pair of bushings 124 and 125 and a central pin 126 provided with nuts at its opposite ends for retaining the pivot bearing assembly. The pivotal mountings of the ends of the control links 120 and 121 on the bushings 124 and 125 is by means of rubber bushings 128 and 129, respectively.

The opposite ends of the control links 120 and 121 are pivotally connected to depending portions of the rock arms 70 and for this purpose journal pins 130 are clamped fixedly in the depending portions of rock arms 70 and are pivotally connected to the adjacent ends of the control links 120 and 121 by means of rubber bushings designated 131 in Fig. 7.

As viewed in plan in Fig. 1 the operation of the control links 120 and 121 in effecting their self-steering control of the wheel axles is generally speaking as follows. When either of the axles 18 or 22 has a tendency to move axially in the direction of its length as in a turning movement of the vehicle or by reason of uneven terrain or any similar influence, such movement of the axle housing exerts a force tending to lengthen the control link at the side toward which the axle is moving and a corresponding shortening or compressive force on the corresponding control link at the opposite side.

Since the control links are relatively rigid lengthwise, excepting for the tolerance provided by their rubber bushed mountings, these lengthening and shortening forces or effects are translated into turning movement of the associated axle housing on a vertical central axis, which directly steers the wheels supported by such axle housing into proper tracking alignment.

Tendencies of the longitudinal members 24 and 25 to move out of alignment as viewed in plan are normally eliminated, controlled or limited by the internal construction and operation of the longitudinal members and associated parts and by the self-steering control action of the control links 120 and 121. However, any excessive movements of the longitudinal members from their normal position of longitudinal alignment are positively limited by scuff plates or wear plates associated with the longitudinal members 24 and 25 and the frame channel members 10 and 11. In Fig. 1 the wear plates fixed to the longitudinal members 24 and 25 are designated 140 and the corresponding wear plates fixed to the frame members 10 and 11 are designated 141.

Referring now to the embodiment of Figs. 8, 9 and 10, the modification there shown is similar to the modification of Figs. 1 through 7 in that it includes a pair of longitudinal walking beam members, one of which is designated generally 175, chassis secured saddle members 176, and support blocks 177. The rotative engagement and relationship between saddle member 176 and support block 177 is substantially the same as in the previous embodiment.

Longitudinal member 175 includes a sloping bottom wall portion 178 having end walls 179, stepped seat formations 180 and horizontal terminal flanges 181, all of these formations being rigidly welded between the opposed side walls of longitudinal member 175.

Two stacks of spring leaves 185 and 186 are supported in the bottom wall and stepped end wall formations just described to act progressively as in the previously described embodiment. In Fig. 8 the structure is shown in a substantially loaded condition wherein both sets of spring leaves are in load bearing relationship. The arcuate lower surface of support block 177 bears downwardly against a bearing plate 188 which in turn rests upon the upper leaf of the spring leaf assembly. Bearing plate 188 is relatively rigid and is slightly arcuate as indicated in Fig. 8.

A rock arm 190 corresponds to the rock arms 70 of the previous embodiment and includes upper generally cylindrical enlargements 191. Longitudinal member 175 is provided with detachable end walls 192 and fixed transverse wall portions 193 which correspond to the fixed wall portions 81 of the previous embodiment. Annular frusto-conical seats 194 and 195 are fixed to each end wall 192 and intermediate wall portion 193, respectively, and similar seat members 197 and 198 are provided upon convex bearing members 199 and 200, respectively, which bear against opposite sides of the enlargement 191 of each rock arm 190.

Generally cylindrical rubber cushioning members 203 and 204 are disposed between the seats 194 and 197 and the seats 195 and 198, respectively. The frusto-conical shape of the seats deforms the normally cylindrical cushioning members 203 and 204 under pressure by causing them to bulge radially. As the cushioning bulge under increasing pressures they engage greater portions of the interior walls of the seats so that their effective free lengths decrease progressively with increasing pressure thereagainst.

In the full line showing of Fig. 10 the cushioning member 204 has been thus deformed until it substantially fully occupies the seat members 195 and 198 and thus reaches a point where it offers extremely high resistances to any further deforming force. This variable rate resistance of the cushioning members is particularly effective in withstanding severe brake application.

The opposite ends of longitudinal member 175 are provided with horizontal wear or bearing plates 210 which are held loosely in the generally channel formation of the longitudinal member and provide a bearing surface for the upper end of each of the generally cylindrical enlargements 191 of the rock arms 190.

In Fig. 8 the numeral 211 designates a pair of distance or spacing members corresponding to the members 100 of the previous embodiment. The adjacent ends of the spacing members 211 engage surfaces on support block 177 as in the previous embodiment and the outer ends thereof engage against rubber blocks 212 which bear against intermediate wall portions 193 and are retained in the general channel formation of the longitudinal members 175 by the terminal flanges 181 of the leaf spring support formations. The rubber bumper designated 214 in Fig. 8 corresponds to the rubber bumper 65 of the previous embodiment and is supported upon a similar seat member fixed to the chassis-attached portion of the structure.

The embodiment of Fig. 8 is there shown under load. When unloaded the groups of spring leaves 185 and 186 are spaced vertically as described earlier herein. In such initial unloaded condition the top leaf of the lower group 185 is arched upwardly to contact the lower leaf of the upper group 186 at approximately a mid point. This contact does not interfere with the sequential operation of the two spring groups described earlier herein but resiliently retains the leaves of the lower group 185 against unseating movements.

It will be noted that the support means 44 and 47 of Fig. 3 and the support means 176 and 177 of Fig. 8 comprise fulcrums which are locatable at predetermined points between the beam ends and in predetermined longitudinal relation with respect to the distance between the axle units. The vertical center lines through these fulcrums as viewed in side elevation divide the beam members into lever arms and the particular location of the fulcrums will determine the ratio of distribution of the weight of the body and frame with respect to the two axle units.

In a concurrently filed application for Letters Patent bearing Serial No. 490,918, now abandoned, I disclose and claim a load proportioning and load shifting arrangement which makes use of this load dividing characteristic and wherein the center line of the support means of the present application is located slightly closer to the trailing axle whereby the load is divided so that a larger constant proportion of the sprung load, that is, the load comprising the frame, the truck body, and the contents thereof, is applied to and borne by the trailing or non-driving axle unit. This ratio will obviously be in inverse proportion to the longitudinal lever arms of the two axle units with respect to the fulcrum.

What is claimed is:

1. In a tandem suspension for vehicles having a pair of longitudinally spaced transverse axle units and a body portion adapted to be supported thereby, a longitudinally extending rigid beam member at each side of said suspension, leaf spring means extending along each beam member and supported at its opposite ends thereby, support means comprising a portion fixed to said body portion and a portion abutting downwardly against said leaf spring means medially thereof, means at opposite ends of each beam member engageable with the ends of said axle units, and longitudinal spacing means acting between said downwardly abutting support portion and said axle unit engageable means.

2. In a tandem suspension for vehicles having a pair of longitudinally spaced transverse axle units and a body portion adapted to be supported thereby, a longitudinally extending rigid beam support at each side of said suspension, leaf spring means extending along each beam support and supported at its opposite ends thereby, bearing means comprising a pair of elements relatively rotatable on a transverse axis, one of said elements being fixed to said body portion and the other abutting downwardly against said leaf spring means medially thereof, means at opposite ends of each of said rigid beam supports engageable with the ends of said axle units, and longitudinal spacing means acting between said downwardly abutting member and said axle unit engageable means.

3. In a tandem suspension for vehicles having a pair of longitudinally spaced transverse axle units and a body portion adapted to be supported thereby, a longitudinally extending rigid support at each side of said suspension, leaf spring means extending along each support and supported at its opposite ends thereby, bearing means comprising a pair of elements relatively rotatable on a transverse axis, one of said elements being fixed to said body portion and the other abutting downwardly against said leaf spring means medially thereof, means at opposite ends of said rigid supports for engagement with the ends of said axle units, and spacing means in abutment with said downwardly abutting element and with said engagement means for maintaining a predetermined minimum longitudinal spacing of said engagement means.

4. In a tandem suspension for vehicles having a pair of longitudinally spaced transverse axle units and a body portion adapted to be supported thereby, a longitudinally extending rigid beam member at each side of said suspension, leaf spring means extending along each beam member and supported at its opposite ends thereby, support means comprising a portion fixed to said body portion and a portion abutting downwardly against said leaf spring means medially thereof, longitudinally resilient means at opposite ends of each beam member engageable with the ends of said axle units, and longitudinal spacing means acting between said downwardly abutting support portion and said longitudinally resilient means.

5. In a tandem suspension for vehicles having a pair of longitudinally spaced transverse axle units and a body portion adapted to be supported thereby, a longitudinally extending rigid beam member at each side of said suspension, leaf spring means extending along each beam member and supported at its opposite ends thereby, means supporting said body portion and supported by said leaf spring means medially thereof, generally upright rock arms fixed to the end portions of said axle units and means engaging their upper ends with said beam members, control link means pivoted to said vehicle frame and extending generally longitudinally to said rock arms and pivoted to the lower portions thereof, and longitudinal spacing means acting between said supporting means and said rock arm engaging means.

6. In a tandem suspension for vehicles having a pair of longitudinally spaced transverse axle units and a body portion adapted to be supported thereby, a longitudinally extending rigid beam member at each side of said suspension, leaf spring means extending along each beam member and supported at its opposite ends thereby, support means comprising a portion fixed to said body portion and a portion abutting downwardly against said leaf spring means medially thereof, generally upright rock arms fixed to the end portions of said axle units and means connecting their upper ends with said beam members for pivotal movement about transverse and longitudinal horizontal axes, control link means pivoted to said vehicle frame and extending generally longitudinally to said rock arms and pivoted to the lower portions thereof, and longitudinal spacing means acting between said downwardly abutting support portion and said rock arm connecting means.

7. In a tandem suspension for vehicles having a pair of longitudinally spaced transverse axle units and a body portion adapted to be supported thereby, a longitudinally extending rigid beam member at each side of said suspension, leaf spring means extending along each beam member and supported at its opposite ends thereby, support means comprising a portion fixed to said body portion and a portion abutting downwardly against said leaf spring means medially thereof, generally upright rock arms fixed to the end portions of said axle units and means engaging their upper ends with said beam members, control link means pivoted to said vehicle frame and extending generally longitudinally to said rock arms and pivoted to the lower portions thereof, and longitudinal spacing means acting between said downwardly abutting support portion and said rock arm engaging means.

8. In a tandem suspension for vehicles having a pair of longitudinally spaced transverse axle units and a body portion adapted to be supported thereby, a longitudinally extending rigid beam member at each side of said suspension, leaf spring means extending along each beam member and supported at its opposite ends thereby, means supporting said body portion and supported by said leaf spring means medially thereof, generally upright rock arms fixed to the end portions of said axle units with their upper ends in longitudinally resilient engagement with said beam members, control link means pivoted to said vehicle frame and extending generally longitudinally to said rock arms and pivoted to the lower portions thereof, and longitudinal spacing means acting between said supporting means and the rock arm engageable portions of said beam members.

9. In a tandem suspension for vehicles having a pair of longitudinally spaced transverse axle units and a body portion adapted to be supported thereby, a longitudinally extended rigid beam member at each side of said suspension, leaf spring means extending along each beam member and supported at its opposite ends thereby, means supporting said body portion and supported by said leaf spring means medially thereof, generally upright rock arms fixed to the end portions of said axle units with their upper ends connected with said beam members for pivotal movement about transverse and longitudinal horizontal axes, control link means pivoted to said vehicle frame and extending generally longitudinally to said rock arms and pivoted to the lower portions thereof, and longitudinal spacing means acting between said supporting means and the rock arm connected portion of said beam member.

10. In a tandem suspension for vehicles having a pair of longitudinally spaced transverse axle units and a body portion adapted to be supported thereby, a longitudinally extending rigid beam member at each side of said suspension having longitudinally resilient means adjacent to its opposite ends, leaf spring means extending along each beam member and supported at its opposite ends thereby, means supporting said body portion and supported by said leaf spring means medially thereof, generally upright rock arms fixed to the end portions of said axle units with their upper ends pivotally connected with said longitudinally resilient means, control link means pivoted to said vehicle frame and extending generally longitudinally to said rock arms and pivoted to the lower portions thereof, and longitudinal spacing means acting between said body portion supporting means and said longitudinally resilient means.

11. In a tandem suspension for vehicles having a pair of longitudinally spaced transverse axle units and a body portion adapted to be supported thereby, a longitudinally extending rigid beam member at each side of said suspension, spring means supported by each beam member, means supporting said body portion and supported by said spring means, means at opposite ends of each beam member engageable with the respective ends of said axle units, and control links pivoted to said vehicle frame and extending forwardly and rearwardly to said axle units and pivoted thereto, said control links extending convergently forwardly and their pivot connections being on generally horizontal axes at right angles to their direction of extent.

12. In a tandem suspension for vehicles having a pair of longitudinally spaced transverse axle units and a body portion adapted to be supported thereby, a longitudinally extending rigid beam member at each side of said suspension, leaf spring means extending along each beam member and supported at its opposite ends thereby, support means comprising a portion fixed to said body portion and a portion abutting downwardly against said leaf spring means medially thereof, generally upright rock arms fixed to the end portions of said axle units with their upper ends in engagement with said beam members, and longitudinal spacing means acting between said downwardly abutting support portion and the rock arm engageable portions of said beam members.

13. In a tandem suspension for vehicles having a pair of longitudinally spaced transverse axle units and a body portion adapted to be supported thereby, a longitudinally extending rigid beam member at each side of said suspension, leaf spring means extending along each beam member and supported at its opposite ends thereby, support means comprising a portion fixed to said body portion and a portion abutting downwardly against said leaf spring means medially thereof, generally upright rock arms fixed to the end portions of said axle units with their upper ends connected with said beam members for pivotal movement about transvers and longitudinal horizontal axes, and longitudinal spacing means acting between said downwardly abutting support portion and the rock arm connected portions of said beam members.

14. In a tandem suspension for vehicles having a pair of longitudinally spaced transverse axle units and a body portion adapted to be supported thereby, a longitudinally extending rigid beam member at each side of said suspension, leaf spring means extending along each beam member and supported at its opposite ends thereby, means supporting said body portion and supported by said leaf spring means medially thereof, generally upright rock arms fixed to the end portions of said axle units with their upper ends in engagement with said beam members, and longitudinal spacing means acting between said supporting means and the rock arm engageable portions of said beam members.

15. In a tandem suspension for vehicles having a pair of longitudinally spaced transverse axle units and a body portion adapted to be supported thereby, a longitudinally extending rigid beam member at each side of said suspension, leaf spring means extending along each beam member and supported at its opposite ends thereby, means supporting said body portion and supported by said leaf spring means medially thereof, generally upright rock arms fixed to the end portions of said axle units with their upper ends connected with said beam members for pivotal movement about transverse and longitudinal horizontal axes, and longitudinal spacing means acting between said supporting means and the rock arm connected portions of said beam members.

16. In a tandem suspension for vehicles having a pair of longitudinally spaced transverse axle units and a body portion adapted to be supported thereby, a longitudinally extending rigid beam member at each side of said suspension, leaf spring means extending along each beam member and supported at its opposite ends thereby, bearing means comprising a pair of elements relatively rotatable on a transverse axis, one of said elements being fixed to said body portion and the other abutting downwardly against said leaf spring means medially thereof, generally upright rock arms fixed to the end portions of said axle units with their upper ends in engagement with said beam members, and longitudinal spacing means acting between said downwardly abutting bearing element and the rock arm engageable portions of said beam member.

17. In a tandem suspension for vehicles having a pair of longitudinally spaced transverse axle units and a body portion adapted to be supported thereby, a longitudinally extending rigid beam member at each side of said suspension, leaf spring means extending along each beam member and supported at its opposite ends thereby, bearing means comprising a pair of elements relatively rotatable on a transverse axis, one of said elements being fixed to said body portion and the other abutting downwardly against said leaf spring means medially thereof, generally upright rock arms fixed to the end portions of said axle units with their upper ends connected with said beam members for pivotal movement about transverse and longitudinal horizontal axes, and longitudinal spacing means acting between said downwardly abutting bearing element and the rock arm connected portions of said beam members.

18. In a tandem suspension for vehicles having a pair of longitudinally spaced transverse axle units and a body portion adapted to be supported thereby, a longitudinally extending generally hollow beam member at each side of said suspension, longitudinally spaced seat means in said beam member, each seat means comprising a plurality of vertically stepped seats, and a plurality of leaf springs supported at their opposite ends on said vertically stepped seats, support means comprising a portion fixed to said body portion and a portion bearing upon the uppermost of said leaf spring means medially thereof, said leaf springs being normally vertically spaced but adapted to engage upon downward deflection of the overlying spring, and means at the opposite ends of said beam member for engagement with the ends of said axle units.

19. In a tandem suspension for vehicles having a pair of longitudinally spaced transverse axle units and a body portion adapted to be supported thereby, a longitudinally extending generally hollow beam member at each side of said suspension, longitudinally spaced seat means in said beam member, each seat means comprising a pair of vertically stepped seats, and a pair of leaf springs supported at their opposite ends on said vertically stepped seats, support means comprising a portion fixed to said body portion and a portion bearing upon the upper leaf spring medially thereof, said leaf springs being normally spaced at their mid portions but adapted to engage upon downward deflection of the upper leaf spring under a predetermined load, and means at the opposite ends of said beam member for engagement with the ends of said axle units.

20. In a tandem suspension for vehicles having a pair of longitudinally spaced transverse axle units and a body portion adapted to be supported thereby, a longitudinally extending generally hollow beam member at each side of said suspension, longitudinally spaced seats in said beam member and leaf spring means supported at its opposite ends on said seats, support means comprising a portion fixed to said body portion and a portion bearing upon said leaf spring means medially thereof, and generally upright rock arms fixed to the end portions of said axle units with their upper ends connected with the opposite ends of said beam members.

21. In a tandem suspension for vehicles having a pair of longitudinally spaced transverse axle units and a body portion adapted to be supported thereby, a longitudinally extending generally hollow beam member at each side of said suspension, longitudinally spaced seats in said beam member and leaf spring means supported at opposite ends on said seats, support means comprising a portion fixed to said body portion and a portion bearing upon said leaf spring means medially thereof, means at the opposite ends of said beam member for engagement with the ends of said axle units, and longitudinal spacing means acting between said support means and said axle unit engaging means.

22. In a tandem suspension for vehicles having a pair of longitudinally spaced transverse axle units and a body portion adapted to be supported thereby, a longitudinally extending generally hollow beam member at each side of said suspension, longitudinally spaced seats in said beam member and leaf spring means supported at its opposite ends on said seats, support means comprising a portion fixed to said body portion and a portion bearing upon said leaf spring means medially thereof, generally upright rock arms fixed to the end portions of said axle units with their upper ends connected with the opposite ends of said beam members, and control means pivoted to said vehicle frame and extending generally longitudinally to said rock arms and pivoted to the lower portions thereof.

23. In a tandem suspension for vehicles having a pair of longitudinally spaced transverse axle units and a body portion adapted to be supported thereby, a longitudinally extending generally hollow beam member at each side of said suspension, longitudinally spaced seats in said beam member and leaf spring means supported at its opposite ends on said seats, support means comprising a portion fixed to said body portion and a portion bearing upon said leaf spring means medially thereof, generally upright rock arms fixed to the end portions of said axle units with their upper ends connected with the opposite ends of said beam members, longitudinal spacing means acting between said support means and the rock arm connected ends of said beam members, and control means pivoted to said vehicle frame and extending generally longitudinally to said rock arms and pivoted to the lower portions thereof.

24. In a tandem suspension for vehicles having a pair of longitudinally spaced transverse axle units and a body portion adapted to be supported thereby, a longitudinally extending generally hollow beam member at each side of said suspension, longitudinally spaced seats in said beam member and leaf spring means supported at its opposite ends on said seats, support means comprising a portion fixed to said body portion and a portion bearing upon said leaf spring means medially thereof, generally upright rock arms fixed to the end portions of said axle units with their upper ends connected with the opposite end of said beam members, and longitudinal spacing means acting between said support means and said rock arm connecting means.

25. In a tandem suspension for vehicles having a pair of longitudinally spaced transverse axles and a body portion adapted to be supported thereby, a longitudinally extending rigid beam member at each side of said suspension, yieldable means acting downwardly against each beam member at its opposite ends, support means comprising a portion fixed to said body portion and a portion abutting downwardly against said yieldable means medially of said beam member, means at opposite ends of each beam member engageable with the ends of said axles, and longitudinal spacing means acting between said downwardly abutting support portion and said axle engageable means.

26. In a tandem suspension for vehicles having a pair of longitudinally spaced transverse axles and a body portion adapted to be supported thereby, a longitudinally extending rigid beam member at each side of said suspension, support means comprising a portion fixed to said body portion and a portion abutting downwardly against said beam member, means at opposite ends of each beam member engageable with the ends of said axles, and longitudinal spacing means acting between said downwardly abutting support portion and said axle engageable means.

27. A tandem axle vehicle suspension adapted to be interposed between a vehicle frame and a pair of tandex axles each having wheels journalled thereon, comprising a frame bracket secured to each side of said frame intermediate said tandem axles and an abutment member, said frame bracket and said abutment member being journalled for relative frictional rotative movement about a horizontal transverse axis, said abutment member having a downwardly facing bearing face, an elongated, generally horizontal supporting member arranged adjacent each abutment member and having at its center an upwardly facing bearing face forming a perch engaging and supporting the corresponding downwardly facing bearing face, one of said bearing faces being curved differently from the other bearing face to permit rocking of each of said elongated supporting members on an axis parallel with said axles, and means movably supporting the opposite ends of each of said elongated supporting members on the corresponding tandem axles.

28. In a tandem suspension for vehicles having tandem axle units and a body portion, a pair of laterally spaced longitudinally extending beam members, leaf spring means extending along each beam member and supported at its opposite ends thereby, support means each comprising a portion fixed to said body member and a portion supported by said leaf spring means medially thereof, said beam members each having abutment means at each end thereof and second abutment means spaced longitudinally inwardly thereof, means on said axle units extending into the space between each pair of abutment means and longitudinally cushioned therein, and yieldable longitudinal spacing means acting between said support means and each of said second abutment means.

29. In a tandem suspension for vehicles having tandem axle units and a body portion, a pair of laterally spaced longitudinally extending beam members, support means each comprising a portion fixed to said body member and a portion supported by one of said beam members medially thereof, said beam members each having abutment means at each end thereof and second abutment means spaced longitudinally inwardly thereof, means on said axle units extending into the space between each pair of abutment means and longitudinally cushioned therein, and yieldable longitudinal spacing means acting between said support means and each of said second abutmentt means.

30. In a tandem suspension for vehicles having tandem axle units and a body portion, a pair of laterally spaced longitudinally extending beam members, leaf spring means extending along each beam member and supported at its opposite ends thereby, support means acting between said body member and said leaf spring means to support the former on the latter medially thereof, each beam member having a rigid chamber formation at each end thereof, means on said axle units extending upwardly into said chambers, yieldably compressible spacing means between said upwardly extending means and the front and rear ends of said chamber formations, and longitudinal spacing means acting between said support means and each of said beam chamber formations.

31. In a tandem suspension for vehicles having tandem axle units and a body portion, a pair of laterally spaced longitudinally extending beam members, support means acting between said body member and said beam members to support the former on the latter medially thereof, each beam member having a rigid chamber formation at each end thereof, means on said axle units extending upwardly into said chambers, yieldably compressible spacing means between said upwardly extending means and the front and rear ends of said chamber formations, and longitudinal spacing means acting between said support means and each of said beam chamber formations.

32. In a tandem suspension for vehicles having tandem axle units and a body portion, a pair of laterally spaced longitudinally extending beam members, support means acting between said body member and said beam members to support the former on the later medially thereof, each beam member having a rigid chamber formation at each end thereof, means on said axle units extending upwardly into said chambers, yieldably compressible spacing means between said upwardly extending means and the front and rear ends of said chamber formations, and longitudinal spacing means acting between said support means and each of said beam chamber formations, said longitudinal spacing means including yieldably compressible means.

33. In a tandem suspension for vehicles having tandem axle units and a body portion, a pair of laterally spaced longitudinally extending beam members, support means each comprising a portion fixed to said body member and a portion supported by one of said beam members medially thereof, said beam members each having abutment means at each end thereof and second abutment means spaced longitudinally inwardly thereof, means on said axle units extending into the space between each pair of abutment means and longitudinally cushioned therein, and longitudinal spacing means acting between said support means and each of said second abutment means.

34. In a tandem suspension for vehicles having a pair of longitudinally spaced transverse axles and a body portion adapted to be supported thereby, a longitudinally extending rigid beam member at each side of said suspension, leaf spring means extending along each beam member and supported at its opposite ends thereby, support means comprising a portion fixed to said body portion and a portion abutting downwardly against said leaf spring means medially thereof, said beam member having a pair of inner and outer longitudinally spaced rigid abutments at each end thereof, means on said axle units extending upwardly between each pair of spaced abutments and longitudinally cushioned therein, and resilient longitudinal spacing means acting between said support means and each of said inner abutments.

35. In a tandem suspension for vehicles having tandem axle units and a body portion, a pair of laterally spaced longitudinally extending beam members, leaf spring means extending along each beam member and supported at its opposite ends thereby, support means acting between said body member and said leaf spring means to support the former on the latter medially thereof, means on said axle units engageable with the opposite ends of said beam member, and longitudinal spacing means acting between said support means and each of the axle engaging portions of said beam members.

36. In a tandem suspension for vehicles having tandem axle units and a body portion, a pair of laterally spaced longitudinally extending beam members, support means acting between said body member and each of said beam members to support the former on the latter medially thereof, means on said axle units engageable with the opposite ends of said beam member, and longitudinal spacing means acting between said support means and each of the axle engaging portions of said beam members.

37. In a tandem suspension for vehicles having tandem axle units and a body portion, a pair of longitudinally extending beam members, support means acting between said body member and said beam members to support the former on the latter medially thereof, each beam member having a rigid chamber formation at each end thereof, generally upright rock arms fixed to the end portions of said axle units with their upper ends extending into said chamber formations, and compressible spacing means between the upper ends of said rock arms and the front and rear ends of said chamber formations.

38. In a tandem suspension for vehicles having a pair of longitudinally spaced transverse axle units and a body portion adapted to be supported thereby, a longitudinally extending generally hollow beam member at each side of said suspension, longitudinally spaced seats in said beam member and leaf spring means supported at its opposite ends on said seats, support means comprising a portion fixed to said body portion and a portion bearing upon said leaf spring means medially thereof, generally upright rock arms fixed to the end portions of said axle units with their upper ends connected with the opposite end of said beam members for relative horizontal resilient movement, and longitudinal spacing means acting between said support means and said rock arm connecting means.

39. In a tandem suspension for vehicles having a pair of longitudinally spaced transverse axles and a body portion adapted to be supported thereby, a longitudinally extending rigid beam member at each side of said suspension, means resiliently supporting said body portion medially thereon, rock arms extending upwardly from the ends of said axles with the opposite ends of said beam members disposed thereon, bearing means between said beam members and the upper ends of said rock arms providing relative rocking movement about longitudinal and transverse horizontal axes, and longitudinal spacing means acting between said body supporting means and the outer portions of said beam members.

References Cited in the file of this patent

UNITED STATES PATENTS

| | | |
|---|---|---|
| 1,743,892 | Hylton | Jan. 14, 1930 |
| 1,891,642 | Harrison | Dec. 20, 1932 |
| 2,303,501 | Ronk | Dec. 1, 1942 |